UNITED STATES PATENT OFFICE.

BRUNO THOMAS, OF SEATTLE, WASHINGTON.

PROCESS OF CONCENTRATING NITRIC ACID.

1,283,598.  Specification of Letters Patent.  Patented Nov. 5, 1918.

No Drawing.  Application filed July 24, 1917.  Serial No. 182,398.

*To all whom it may concern:*

Be it known that I, BRUNO THOMAS, a citizen of the United States, and resident of the city of Seattle, county of King, and State of Washington, have invented certain new and useful Improvements in Processes of Concentrating Nitric Acid, of which the following is a specification.

My invention relates to the manufacture of nitric acid and consists of a process wherein absorption of the gases is increased by the use of pressure and concentration and purification is increased by the use of electrolysis.

In accordance with the laws of Henry and Dolton, it has been shown that the absorption of gas by a fluid is increased with the pressure of the gas upon the fluid. I, therefore, subject gases which contain nitrogen to pressure while in contact with water.

A common source of the nitrogenous gases is the electric furnaces which oxidize the nitrogen of the air. The product of such furnaces is a weak nitric acid which also contains a considerable percentage of the lower nitrogen oxids, as NO and $NO_2$, the presence of which in the final product is objectionable.

By the use of pressure during the absorption process I may obtain a product having a concentration of 40% of nitric acid. This is impure in that it has considerable NO and $NO_2$. I then electrolize the liquid, that is, pass a current of electricity through it. This liberates oxygen at the anode and this oxygen unites with the lower oxids of nitrogen to form nitric acid, $HNO_3$.

At the same time, or alternately, as may be desired, additional gas under pressure is applied, which is absorbed and then purified by the electrolysis. In the electrolytic action the temperature of the acid should be kept below 40° C. The electrolytic cells used may be of the sort which treat different charges successively, or of a continuous character in which there is a flow of the acid between the electrodes.

This process may be carried out as two consecutive and alternating steps, one being the absorption of gas under pressure and the other its purification by electrolysis, or the two steps may be overlapping and acting at the same time. The process is continued until the required strength of acid is obtained.

What I claim is:

1. The process for the manufacture of nitric acid which consists in absorption of gas by liquid under an excess pressure and its purification by electrolysis.

2. The process for the manufacture of nitric acid which consists in absorbing nitrogenous gas in a liquid under pressure and at the same time converting the lower oxids of nitrogen into nitric acid by electrolysis.

Signed at Seattle, Washington, this 19th day of July 1917.

BRUNO THOMAS.